US006368214B1

(12) United States Patent
Luciano

(10) Patent No.: US 6,368,214 B1
(45) Date of Patent: Apr. 9, 2002

(54) METHOD AND DEVICE FOR PLAYING A KENO GAME IN WHICH A PLAYER IS CHARGED FOR PERFORMING GAME PLAYING ACTIONS

(75) Inventor: Robert A. Luciano, Reno, NV (US)

(73) Assignee: Sierra Design Group, Reno, NV (US)

( * ) Notice: Subject to any disclaimer, the term of this patent is extended or adjusted under 35 U.S.C. 154(b) by 0 days.

(21) Appl. No.: 09/665,742

(22) Filed: Sep. 20, 2000

Related U.S. Application Data

(60) Continuation-in-part of application No. 09/267,126, filed on Mar. 10, 1999, now Pat. No. 6,129,632, which is a division of application No. 08/866,931, filed on May 31, 1997, now abandoned.

(51) Int. Cl.$^{7}$ .............................. A63F 3/06; A63F 13/00

(52) U.S. Cl. .............................. 463/18; 463/17; 463/19; 463/25; 273/269; 273/138.1; 273/138.2; 273/139

(58) Field of Search ............................... 463/16–19, 25; 273/269, 138.1, 138.2, 139

(56) References Cited

U.S. PATENT DOCUMENTS

| | | | | |
|---|---|---|---|---|
| 5,043,818 | A | * | 8/1991 | Weingardt |
| 5,100,137 | A | * | 3/1992 | Fulton |
| 5,192,076 | A | * | 3/1993 | Komori |
| 5,401,024 | A | * | 3/1995 | Simunek |
| 5,632,485 | A | * | 5/1997 | Woodland et al. |
| 5,651,735 | A | * | 7/1997 | Baba |

FOREIGN PATENT DOCUMENTS

| | | |
|---|---|---|
| GB | 2230373 | * 10/1990 |

* cited by examiner

*Primary Examiner*—Benjamin H. Layno
(74) *Attorney, Agent, or Firm*—Ian F. Burns

(57) ABSTRACT

A method of playing a keno wagering game that is based upon a multi-step game is disclosed. The method utilizes an underlying keno game that allows the player to perform predefined chargeable actions while the player is playing the underlying game. The player is charged for each chargeable action the player performs. The player is awarded a prize if a predefined prize event or condition occurs during the game. The method of the present invention may be applied to solitaire, poker, blackjack, slot machines, and many other kinds of games.

17 Claims, 14 Drawing Sheets

FIG. 2E

| HAND | STANDARD HAND PAYS | SAME COLOR HAND PAYS | SAME SUIT HAND PAYS |
|---|---|---|---|
| 1 ST BJ | 3 | 6 | 9 |
| 2 ND BJ | 4 | 8 | 12 |
| 3 RD BJ | 5 | 10 | 15 |
| 4 TH BJ | 6 | 12 | 18 |
| 1 ST-3 RD 21 | 2 | 4 | 6 |
| 4 TH-6 TH 21 | 3 | 6 | 9 |
| 7 TH- 21 | 4 | 8 | 12 |
| 6 CARDS UNDER 21 | 4 | 8 | 12 |
| 20 | 1 | 3 | 5 |
| 4 SUCCESSIVE BJ S IN ONE COLUMN | 50 | 150 | 500 |
| 3 SUCCESSIVE BJ S IN ONE COLUMN | 20 | 60 | 125 |
| 5 SUCCESSIVE 21 S IN ONE COLUMN | 15 | 45 | 100 |

USE ALL 52 CARDS......... 25

FIG. 4A
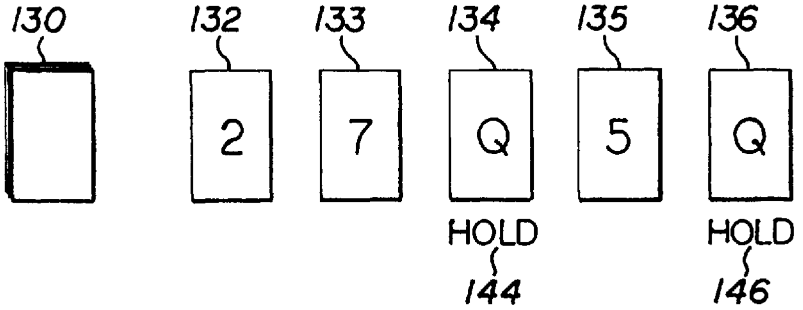
FIG. 4B
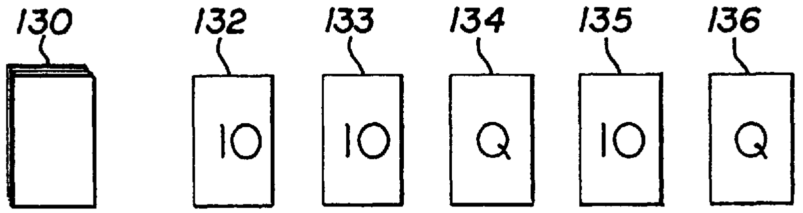
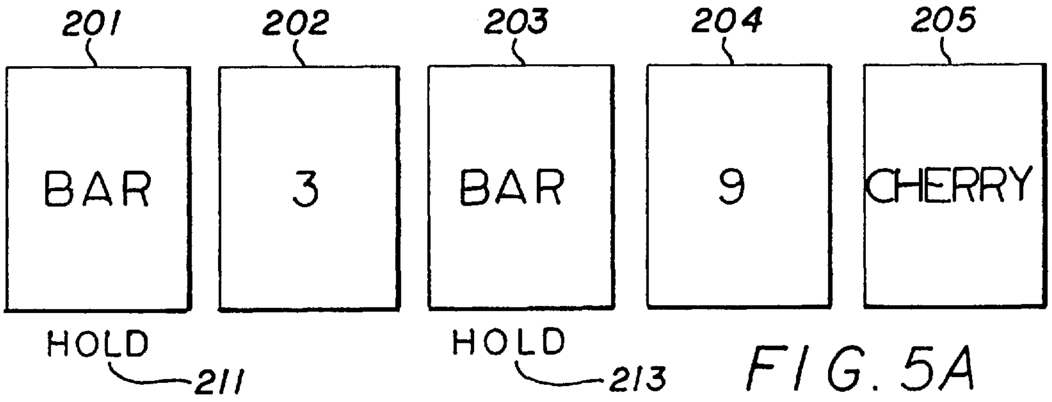
FIG. 5A
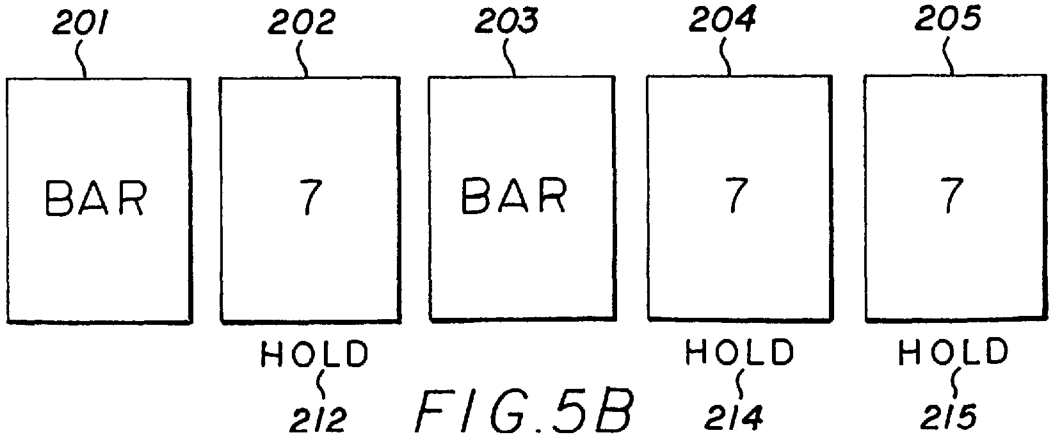
FIG. 5B

METHOD AND DEVICE FOR PLAYING A KENO GAME IN WHICH A PLAYER IS CHARGED FOR PERFORMING GAME PLAYING ACTIONS

CROSS REFERENCE TO RELATED APPLICATIONS

This application is a continuation-in-part application of U.S. patent application Ser. No. 09/267,126, filed on Mar. 10, 1999, now U.S. Pat. No. 6,129,632 which is a divisional application of U.S. patent application Ser. No. 08/866,931, filed on May 31, 1997, now abandoned.

BACKGROUND OF THE INVENTION

1. Field of Invention

The present invention relates to a method for playing a wagering game. More particularly, the method is intended for use with an underlying game that requires a player to take multiple actions or game-playing steps to complete a single game cycle. In the method of the present invention, the player is charged a predefined amount for predefined chargeable actions the player performs to play the underlying game and the player may be awarded prizes when predefined events or conditions occur.

2. Description of Related Art

Multi-step games are well known in the art. These games require a player to take a number of actions or game-playing steps in order to complete a game cycle. For example, the game of solitaire requires a player to take multiple actions in order to play and ultimately win the game. The player must shuffle through a partial deck of cards, move cards from the deck to columns, move cards between the columns, turn over cards in the columns, move cards from the columns to sequential suited stacks, and move cards from the deck to the sequential suited stacks. In general, the longer the player plays, the more game-playing steps the player will perform and the closer the player will come to winning the game.

Many people enjoy playing long-duration, multi-step games because these games have a long game cycle and they tend to involve a large degree of skill. However, in the past, multi-step games have not lent themselves to wagering. Wagering games generally have a short game cycle so that more wagers can be made in a given period of time. Casinos and other wagering game operators generally do not profit from games that last a relatively long period of time because, before the present invention, only one wager is made during the course of the game. What has long been needed is a method and device by which multi-step games may be adapted to wagering.

U.S. Pat. No. 5,711,715, issued to Ringo et al., appears to disclose a method and device that is capable of allowing players to play solitaire on an electronic device. The game is played in a tournament fashion where top ranked players win prizes. Players are ranked according to scores they obtain during the play of the game.

However, Ringo et al. does not provide a means for playing solitaire as a wagering game. Rather, the game is played like an arcade game where players pay to begin a game cycle. Furthermore, no prizes are awarded during the course of each game. Players must compete with other players in a tournament in order to win a prize.

SUMMARY OF INVENTION

1. Advantages of the Present Invention

An advantage of the present invention is that it allows a casino to offer multi-step games as wagering games.

Another advantage of the present invention is that in allowing a casino to offer multi-step games, more players are attracted to the games and the players tend to play longer.

Another advantage of the present invention is that it charges a predefined amount for each predefined chargeable action or game-playing step the player performs. Therefore, the more a player plays, the more income tends to be generated by the game.

Yet another advantage of the present invention is that it is adapted to be used with electronic devices.

Another advantage of the present invention is that it provides a multi-step wagering game that allows a player to use skill to prolong the game.

A further advantage of the present invention is that provides a wagering game that allows a player to win a large jackpot.

Another advantage of the present invention is that it provides a wagering game that may have a long or indeterminate length of game cycle.

Yet another advantage of the present invention is that it provides a multi-step wagering game that is enjoyable to play and attracts players who like to play multi-step games.

These and other advantages of the present invention may be realized by reference to the other portions of the specification, claims, and abstract.

2. Brief Description of the Invention

The present invention provides a method by which an underlying long-duration, multi-step game may be wagered upon. The method begins with a player making credits available to play the game. The credits may be deposited in a credit bank for access during the game. During the course of the game, credits may be added to or deducted from the credit bank.

Once the credits are made available, the player begins the game according to the rules of the particular underlying game. The game requires an indefinite number of game playing actions to play the game. During the course of the game, the player will perform certain actions which are predefined "chargeable" actions. A credit or credits are deducted from the player's credit bank whenever the player performs one of these actions. The credits charged the player are not additional wagers or antes; they are not required to initiate the game and they do not effect the size of any prize or jackpot which the player may receive. Credits are charged during the course of the game as chargeable actions are performed. The sizes of the prizes the player may win are determined substantially independently from the amount of credits charged. It is possible in some embodiments of the present invention for the player to be charged nothing and yet the player may win a prize.

If a predefined prize event or condition occurs during the course of the game, the player may be awarded a predefined prize. The prize amount may be credited to the player's bank and it may be any amount which is defined by the rules of the game.

The game would continue in this way until a point of termination is reached. A point of termination may occur when the player chooses to terminate play, no further game playing steps can be taken, or some predefined event or condition occurs.

The above description sets forth, rather broadly, the more important features of the present invention so that the detail description which follows may be better understood so that present contributions to the art may be better appreciated. There are, of course, additional features of the invention that will be described hereinafter and which will form the subject matter of claims appended hereto. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIGS. 2A–2E are substantially schematic representations and a pay table of a black jack based game that may be played with the method of the present invention.

FIGS. 4A–4B are substantially schematic representations of a poker game that may be played with the present invention.

FIGS. 5A–5B are substantially schematic representations of a reel-type game that may be played with the present invention.

DESCRIPTION OF THE PREFERRED EMBODIMENT

The method of the present invention is intended primarily for electronic devices that would use software to implement the invention. However, it is recognized that the method may be adapted to table games and board games that do not utilize electronic devices.

General Method

Figure 1:
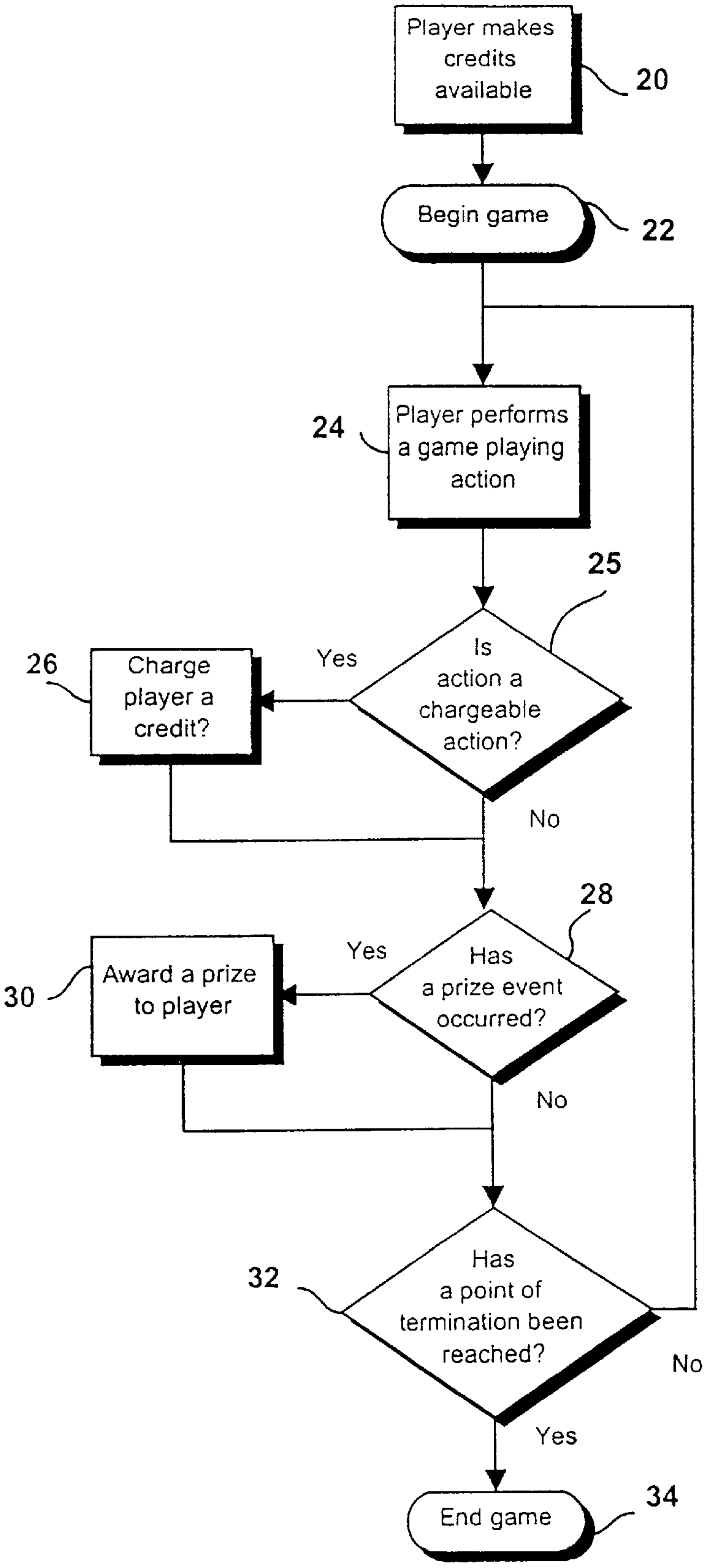
FIG. 1 is substantially a flow chart of the underlying method of the present invention.

The present invention comprises a method that may be applied to many different games. As seen in FIG. 1, the method may begin by the player making available credits to play the game 20. This may include the player inserting coins or other forms of money, such as paper currency, into a counting device or the player may add credits with a portable memory device, such as a card with a magnetic strip or a voucher. In the present invention, credits may represent any denomination of any currency. If an electronic gaming device is used, the credits are placed in a virtual bank where credits may be subtracted and added to the bank during the course of the game. If no gaming device is used, a dealer or banker may hold or track credits during the game.

After the player has made credits available 20, the player may begin the game 22. The underlying game may begin automatically when the player makes a predefined number of credits available or the player may be required to initiate the game.

Once the game has begun 22, the player performs "game playing" actions that are performed to play the underlying game 24. Game playing actions are required or necessary to play the underlying game and complete a game cycle. In solitaire, game playing actions include but are not limited to moving cards from the partial deck of cards, moving cards between columns, turning over face-down cards in the columns, moving cards from the columns to the sequential suited stacks and moving cards from the partial deck to the sequential suited stack.

After each game playing action, the method of the present invention inquires to determine if the action is a chargeable action 25. In the preferred embodiment, a chargeable action may be any game playing action other than an action that initiates the game. For example, if the underlying game is solitaire, the act of removing a card from the partial deck and placing it in a column could be defined as a chargeable action. A chargeable action may also include moving a card from a column to a sequential-suited stack of cards.

Alternatively, a chargeable action may require the player to perform some action outside of the game. The player, for example, may be required to push a button before performing a game playing action in order to pay the required credits. Some game playing actions may require more credits than others.

Credits charged for chargeable actions are not wagers or antes found in other games. Wagers and antes are put at risk at the beginning of a game cycle as a requirement for participating and initiating the game. Jackpots or prizes won during the game are often calculated as a ratio of the wager. The credits charged in the present invention, on the other hand, are fees imposed for actions performed during the course of the game. The prizes given to the player are determined substantially independently from the charges.

When the player performs a predefined chargeable action, one or more credits are deducted from the player's bank of credits 26. At this point in the method of the present invention, the game may be examined to determine if a predefined prize, event or condition has occurred 28. A predefined prize event may be any event or occurrence that is defined to award a prize to the player. For example, in the game of solitaire, the predefined event may occur when the player has placed all of the cards in the sequential-suited stacks of cards. Alternatively, the predefined event may occur when a player places a single card in one of the sequential-suited stacks. If the predefined event has occurred 28, a prize is awarded to player 30. The prize may be any predefined credit amount, a physical prize, or a service. For example, credits could be added to the player's bank. The size or value of the prize awarded to the player may be a fixed or it may be determined from variable. For example, different prize events may receive different prizes or the prize may be a proportional to one or more chargeable actions. If a predefined prize event or condition has not occurred 28, no prize is awarded.

In the method of the present invention, the game is then examined to determine if the end of the game has been reached 32. This may occur either by the underlying game reaching a state in which progress is impossible, by the player voluntarily terminating the game, or the credit bank being empty. In the case of the credit bank being empty, the player may be given the opportunity to add more credits. If the end of the game has been reached 32, the game is concluded 34, and the player may be given any credits that remain in the credit bank. If the end of the game has not been reached 32, the method of the present invention returns to a point where the player may perform another action. In this way, the player may continue to play the game 20 until a point of termination is reached.

Blackjack

Figure 2A:
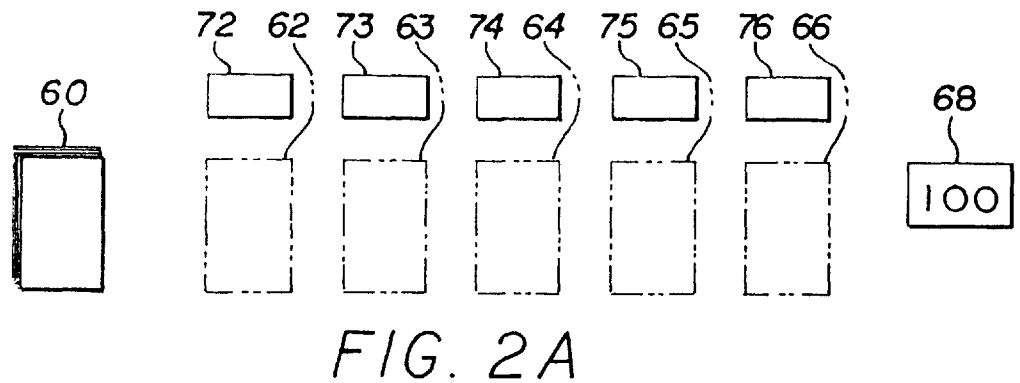

FIGS. 2A through 2E disclose a novel game that may be used with the method of the present invention. FIG. 2A may be presented to a player as an initial screen on an electronic gaming device. A deck of cards 60 is presented face down and five columns 62–66 are presented for receiving cards. A credit bank indicator 68 is provided for indicating the current amount of credits in the virtual credit bank. Each column 62–66 has card value indicator 72–76, respectively, for indicating the value of the cards in the respective column. The deck is preferably a standard 52-card deck that has been shuffled or randomized so that the cards are in a random order. Other embodiments may include special cards, or an infinite deck that is reshuffled after each card is drawn. At this point, a player may make credits available to play the game and may initiate the game.

Figure 2B:
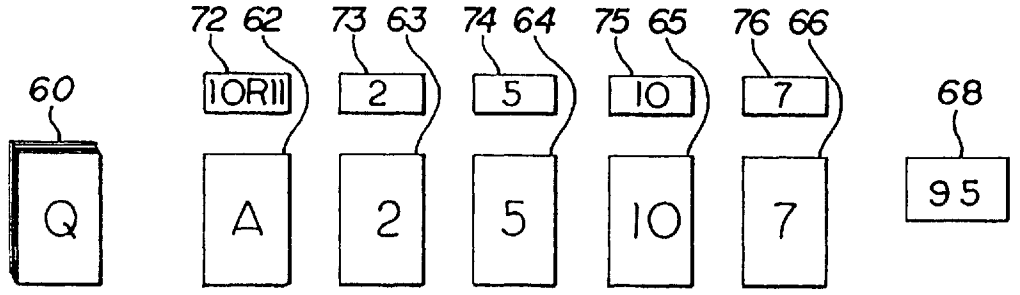

In FIG. 2B, the electronic gaming device has dealt the initial cards from deck 60 into columns 62–66. In this embodiment, the action of initiating the game process may be a chargeable action that would deduct a predefined number of credits from the player's credit bank. Thus, credit bank 68 indicates 95 credits, one credit being deducted for each card dealt.

In this underlying game, a prize event occurs when the player arranges a twenty-one hand (any combination of cards that have a sum of 21) in a column. A player may move a card from the deck 60 to any of columns 62–66 as long as the total value of the cards in the column is not a "bust" (in excess of 21). In an alternative embodiment, a player may dispose of a card or replace a card back into the deck. These actions may be chargeable actions. Once a card is placed in a column, the player cannot move the card.

Other prize winning events may be defined. For example, two or more 21 hands in one column may be awarded an additional prize. Ranks, suits, or colors may also be used as a basis for awarding prizes.

The table disclosed in FIG. 2E is an example of a pay table which may be used with the blackjack embodiment of the present invention. Winning events may include a series of events, such as two or more blackjacks. Subsequent occurrences may receive a higher prize value than previous occurrences. For example, the second occurrence of a blackjack in a column may receive more than the first occurrence. A series of prize winning events that occur in immediate succession qualify for higher prize values than non-immediate successive occurrences of the same events. Events in immediate succession in a single column may also receive higher prize values than events that occur in different columns. Combinations of winning events may receive higher prize values than events that are a portion of the combination.

Figure 2C:
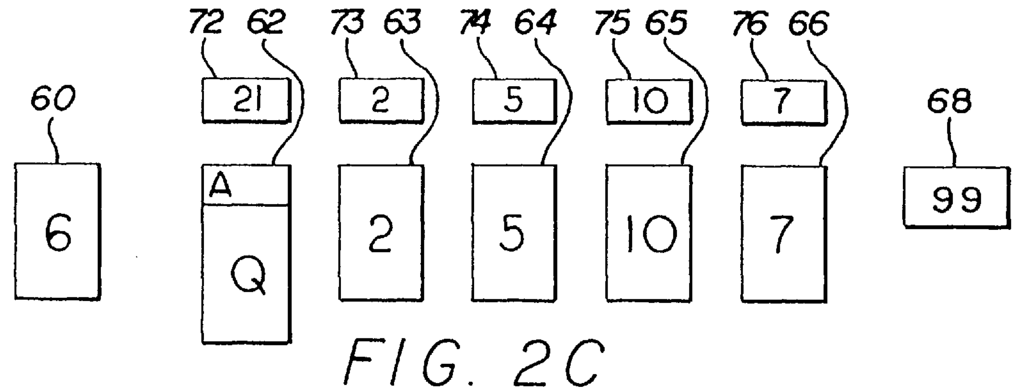

Returning to FIG. 2B, the player, seeing that a queen is face up in deck 60, would put the queen in column 62. The action of moving the queen from deck 60 to column 62 may be a chargeable action that triggers the deduction of another credit from the player's bank. However, since the player has arranged a twenty-one hand in a column, as seen in FIG. 2C, the player would be awarded a predefined prize amount. For example, the prize may be five credits. Since a credit was deducted for moving the queen from deck 60 to column 62, the player's net gain is four credits and the credit bank 68 indicates 99 credits. Once a twenty-one hand is obtained in a column, the cards that comprise the hand are canceled and the value of the cards in the column is zero. The canceled cards may be removed from the column and hidden from view so that the player may use card-counting skills to improve performance. Alternatively, the cards may be left in view.

Figure 2D:
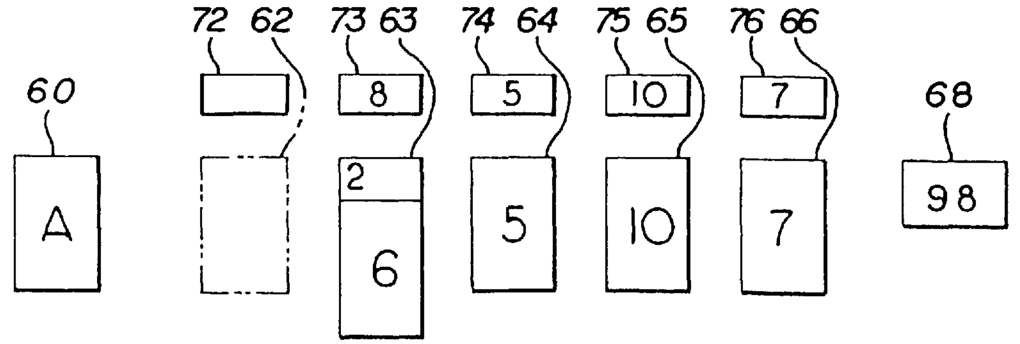

The player now sees that a six card is face up in deck 60. The player has the option of placing the card in any column that would not lead to a bust. Therefore, the player may wish to move the six cards from deck 62 to column 63 as seen in FIG. 2D. The action of moving the card from deck 60 to column 63 automatically deducts a credit from the player's bank and display 68 indicates 98 credits. The game would continue this way until the player has a card showing in deck 60 that cannot be put into a column without busting the column or there are no more cards in the deck. A large prize or jackpot may be awarded if the player successfully places all of the cards in columns 62–66.

This game may take several minutes to complete and the player's skill and intelligence can prolong the game and maximize prize awards. The player may count the cards and track cards that remain in the deck. An operator of the game benefits because the theoretical hold of the game (the amount that is expected to be retained by the operator over time) is sufficient for the operator to make a profit.

The present invention also allows the game operator to offer large prizes. The probability of obtaining a winning hand in a standard blackjack game is relatively high. Consequently, game operators can only offer small prizes. However, the probabilities of occurrence of some events in the present invention are very low. For example, the probability of obtaining eight suited twenty-one hands in a single column is very low. Therefore, the game operator can offer a large prize for this event. By offering large prizes, the game operator may attract more players and generate more revenue.

Solitaire

Figure 3:
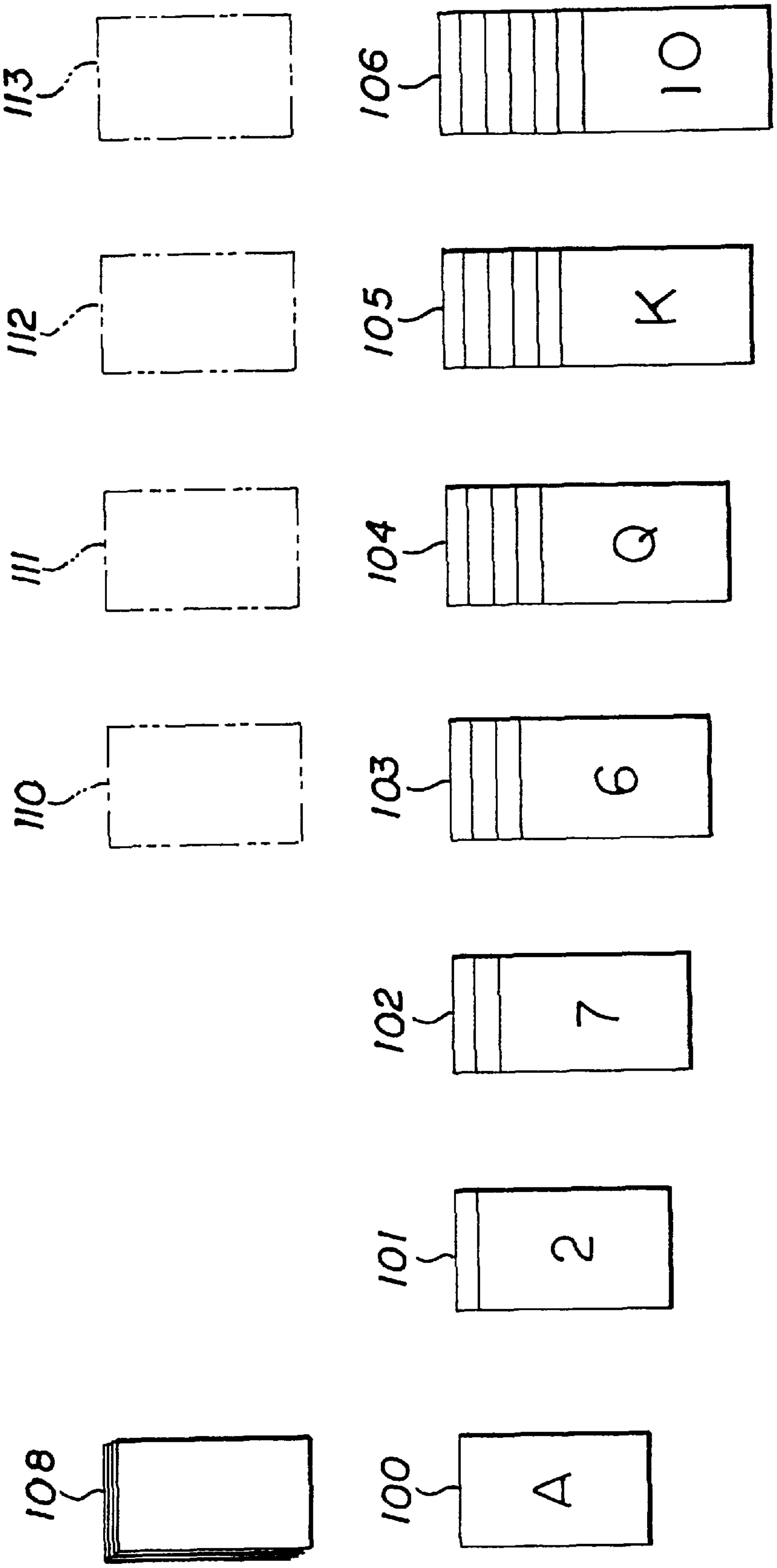
FIG. 3 is substantially a schematic representation of a solitaire game that may be played with the present invention.

FIG. 3 represents the initial layout of a standard game of solitaire. This game may be played electronically or with a deck of cards. If the game is played electronically, symbols or representations of playing cards are displayed. When the game is played, cards are placed in positions 110–113 to establish sequential suited stacks of cards.

In the preferred embodiment, seven groups or columns of cards 100–106 are arranged with each column containing a predefined number of cards. The number of columns may vary and the number of cards in the columns may vary. In the preferred embodiment, the player is only able to see the top card in each column 100–106. As the player moves cards from columns 100–106, the player may turn over or reveal the card that lies below the top card.

A partial deck of cards 108 contains all cards that were not dealt into the columns 100–106. During the play of the game, the player may reveal one or more cards from the top of deck 108. The revealed card or cards may then be moved to columns 100–106 or sequential suited stacks of cards.

The game of solitaire and its many variations are well known in the art. The method of playing solitaire will not be described in detail. However, the method of the present invention may be applied to this game. A chargeable action may be defined to be any action that is required to play the game. For example, a chargeable action may occur when the player shuffles through the partial deck of cards 108, moves cards from the deck 108 to columns 100–106, moves cards between the columns, turns over cards in columns, moves cards from the columns to sequential suited stacks 110–113, and moves cards from the deck to the sequential suited stacks. Each time a player performs a chargeable action, such as moving a card from deck 108 to columns 100–106, the player is charged a predefined amount.

Similarly, a prize winning event may be defined as almost any event that can occur during the play of the game. For example, a prize winning event may occur when a player moves a card from either deck 108 or columns 100–106 to the sequentially suited stacks 110–113 or when a player succeeds in placing all of the cards in the sequentially suited stacks. Each time a prize winning event occurs, a prize may be awarded to the player.

The solitaire embodiment of the present invention may be played on an electronic device. Solitaire is included on many Microsoft operating systems, such as Windows and Window NT. Consequently, solitaire is widely played on personal computers. It is well within the ability of someone of ordinary skill in the art to modify the software used to play solitaire to incorporate the method of the present invention.

Poker

FIG. 4A represents an initial layout for a poker game that may utilize the method of the present invention. Cards from a deck of shuffled cards 130 are dealt to five card positions 132–136. Chargeable actions may include dealing a card from deck 130 to any of the card positions 132–136. Once the initial hand is dealt, the player may inspect the cards and hold any or none of the cards. In the example shown in FIG. 4A, the player has chosen to hold the cards in positions 134 and 136 as indicated by "HOLD" indicators 144 and 146. New cards would then be dealt to non-hold positions 132, 133 and 135.

As seen in FIG. 4B, new cards are dealt to the non-hold positions. If the player does not receive a prize winning hand in the new hand, the player may continue to hold the same cards, may select additional hold cards, or may select all new hold cards. New cards may continue to be dealt until a prize winning hand is received or all of the cards have been dealt. In FIG. 4B the player received three ten cards and has attained a full house. A full house may be defined to be a prize winning event that would pay the player a predefined prize. In the preferred embodiment, once the player has received a prize winning hand, all of the cards of the hand are discarded and the player receives five new cards. The game would continue this way until a point of termination is reached, such as the player terminating the game or all the cards are dealt.

Variations of this game may include displaying discarded or used cards so that the player need not count the cards, allowing the player to hold cards from a winning hand, using multiple decks, and using wild cards. Various modified poker games may also be used with the present invention. In the preferred embodiment, commonly used poker pay tables are used to define winning events.

Reel-Type Slot Machine

FIG. 5A represents a display of a reel-type slot machine. The display may be physical reels or a video screen. In this embodiment of the present invention, the player activates the machine, which may be a chargeable action, and generates a random output as displayed on reels 201–205. The player may then select one or all of the reels to hold. These reels will not rotate when the player activates the reel spinning portion of the game. "HOLD" indicators 211 and 213 indicate the reels selected for hold. If the player holds no reels, all the reels will spin. The act of holding a reel may be a chargeable action for which the player is charged.

Having selected reels 201 and 203 to hold, the player may activate the reels and obtain a new display. The act of spinning the reels may also be a chargeable action. Having received a seven on reels 202, 204, and 205, as seen in FIG. 5B, the player may decide to hold these reels, as indicated by "HOLD" indicators 212, 214, and 215. The player would then spin reels 201 and 203. The player could continue this way until a winning output or combination of symbols is obtained. If a winning output is obtained, the player is awarded a prize and the player may not be allowed to hold any of the reels. Alternatively, the player may be allowed to hold some of the reels. The game may continue this way indefinitely.

Keno

Figure 6A:
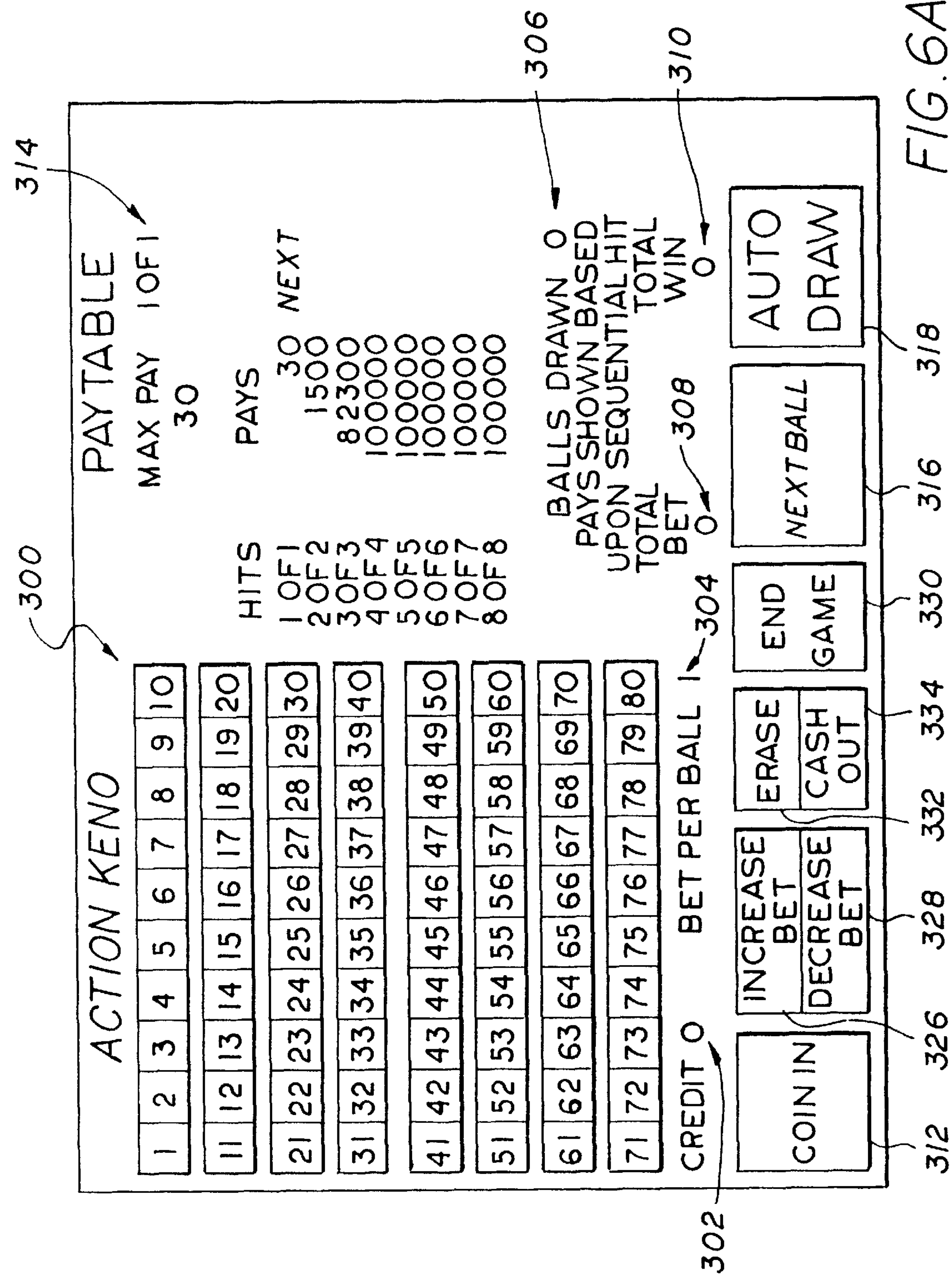
FIGS. 6A–6D are substantially schematic representations of a keno game that may be played with the present invention.

The present invention may also be implemented with a keno game. FIG. 6A represents a starting position for a keno game that may be played on an electronic device. Card 300 represent a standard keno card from which a player may select numbers. Credit meter 302 displays the number of credits placed in the virtual bank and bet per ball 304 displays the number of credits bet per ball that is drawn. Balls drawn 306 displays the number of balls that have been drawn, total bet 308 displays the total number of credits that have been bet, and total win 310 displays the total number of credits that have been won.

Figure 6B:
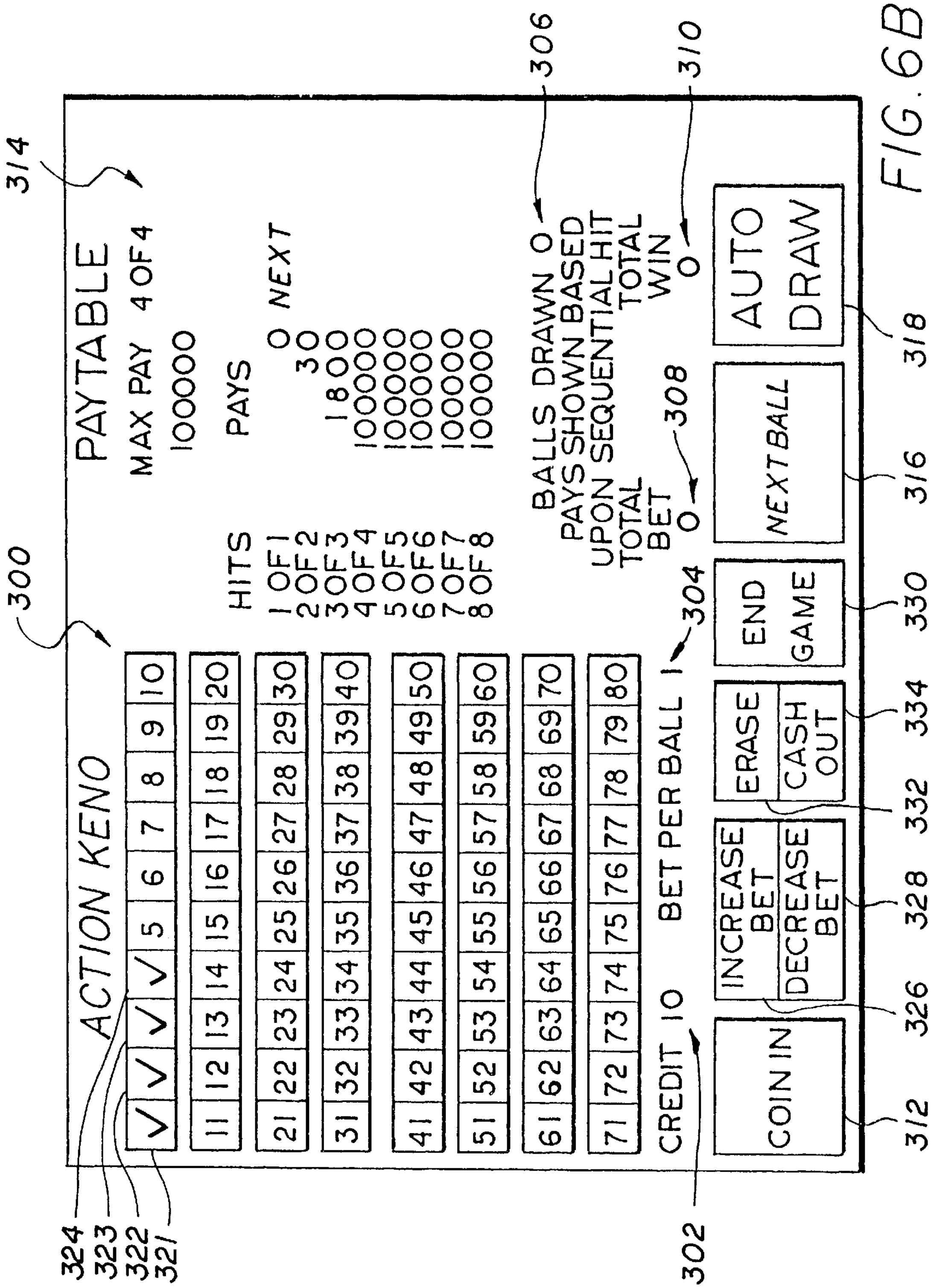

Turning now to FIG. 6B, in order to play the game, the player must provide credits. The embodiment shown in FIGS. 6A–6D, is designed to be played on a personal computer that does not accept actual coins or currency. Thus, a player adds credits to the game by clicking on coin in button 312. In the example shown in FIG. 6B, the player has pressed coin in button 312 ten times and increased credit meter 302 to 10.

Once credits have been provided, the player may increase the bet per ball by clicking on increase bet button 326 or decrease the bet per ball by clicking on decrease bet per ball button 328. In FIG. 6B, decrease bet per ball button 328 is shown in an disabled state (letters not solid) because the bet per ball 304 is set to the minimum bet of one credit per ball drawn.

Continuing to refer to FIG. 6B, once credits are provided, the player is allowed to select any of the numbers from card 300. In the example shown, the player has selected four numbers: one, two, three, and four. The check marks 321–324 on these numbers indicates that the numbers have been selected.

Paytable 314 to the right of card 300 indicates the possible prizes that may be awarded to the player. In the preferred embodiment, paytable 314 is dynamic. The starting values of paytable 314 depend on the number of numbers selected from card 300. In the example shown, if the player draws balls that match one of the four selected numbers, the player will not be awarded a prize. If the player draws balls that match two of the four selected numbers, the player will be awarded 30 credits. If the player draws balls that match three or four of the selected numbers, the player will be awarded 1,800 or 100,000 credits, respectively. As shown on the top of paytable 314, the maximum prize that will be awarded under these conditions is 100,000 credits.

Figure 6C:
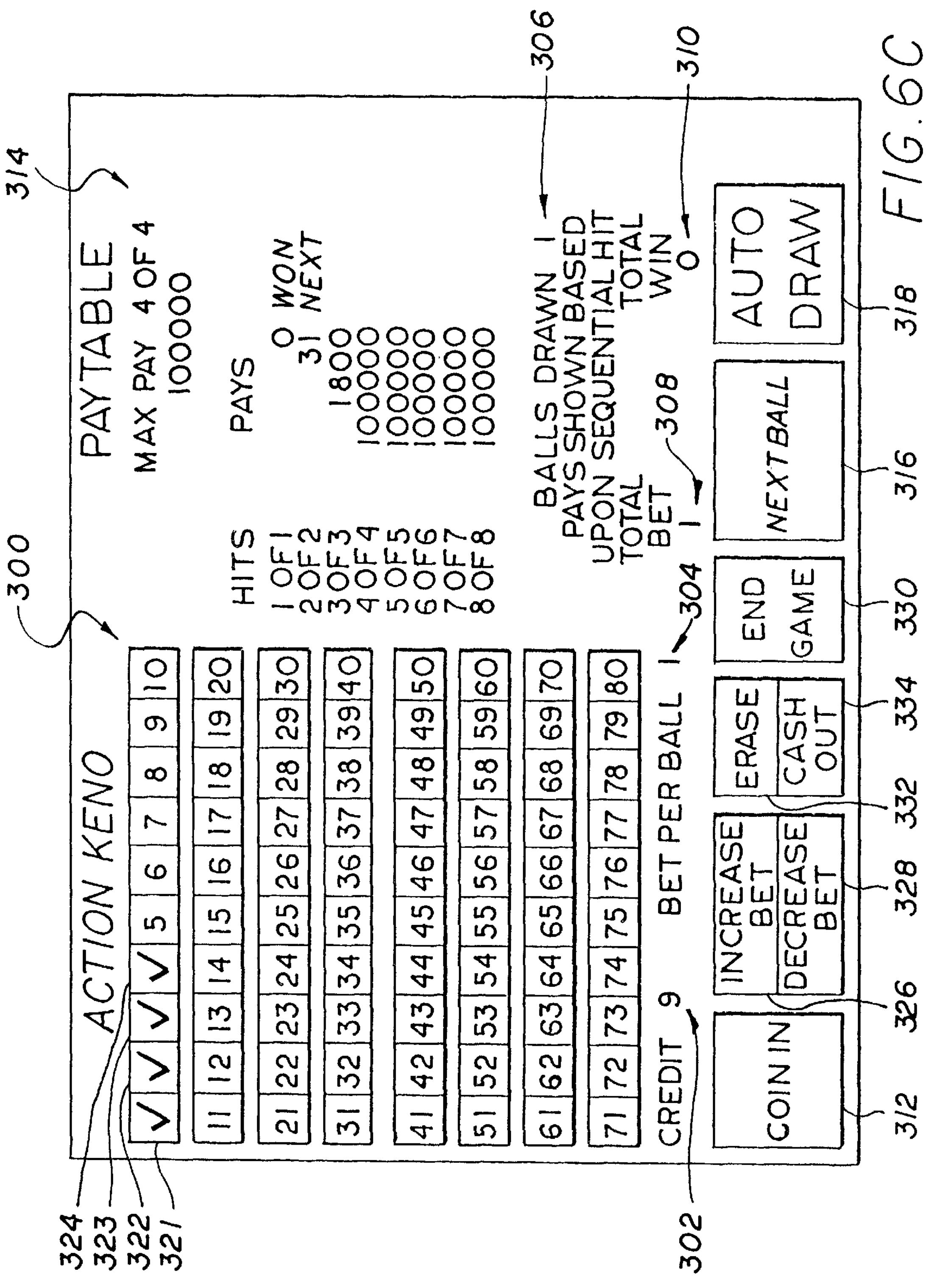

As seen in FIG. 6C, the player can draw a ball by clicking a next ball button 316 or an auto draw button 318. Next ball button 316 draws one ball while auto draw button 318 draws balls until either the player is out of credits or a ball that is drawn is one of the numbers selected by the player. In the preferred embodiment, the act of drawing a ball is chargeable action. Therefore, each time the player draws a ball, a credit is deducted from the player's virtual bank. In the example shown, the player has drawn one ball (see balls drawn 306), one credit has been bet (see total bet 308), and one credit has been deducted from the virtual bank (see credit meter 302).

As in the traditional game of keno, the balls are drawn in a random order using any of a number of methods that are well known in the art. For example, when the present invention is implemented on a gaming device, this can be accomplished by generating a random number and then comparing the random number to a table that contains all of the balls in the game.

Also in the example shown, the ball that was drawn was a three ball, one of the numbers selected by the player. To indicate that a three ball has been drawn, check mark 323 is displayed in a color that is different from check marks 321, 322, and 324. Since paytable 314 did not provide a prize for drawing only one of the selected numbers, the player was not awarded a prize (see total win 310). Since the player has drawn one of the selected numbers, paytable 314 has changed and the player will now receive 31 credits (as apposed to 30 credits previously indicated) if the next ball drawn is one of the player's selected numbers.

Figure 6D:
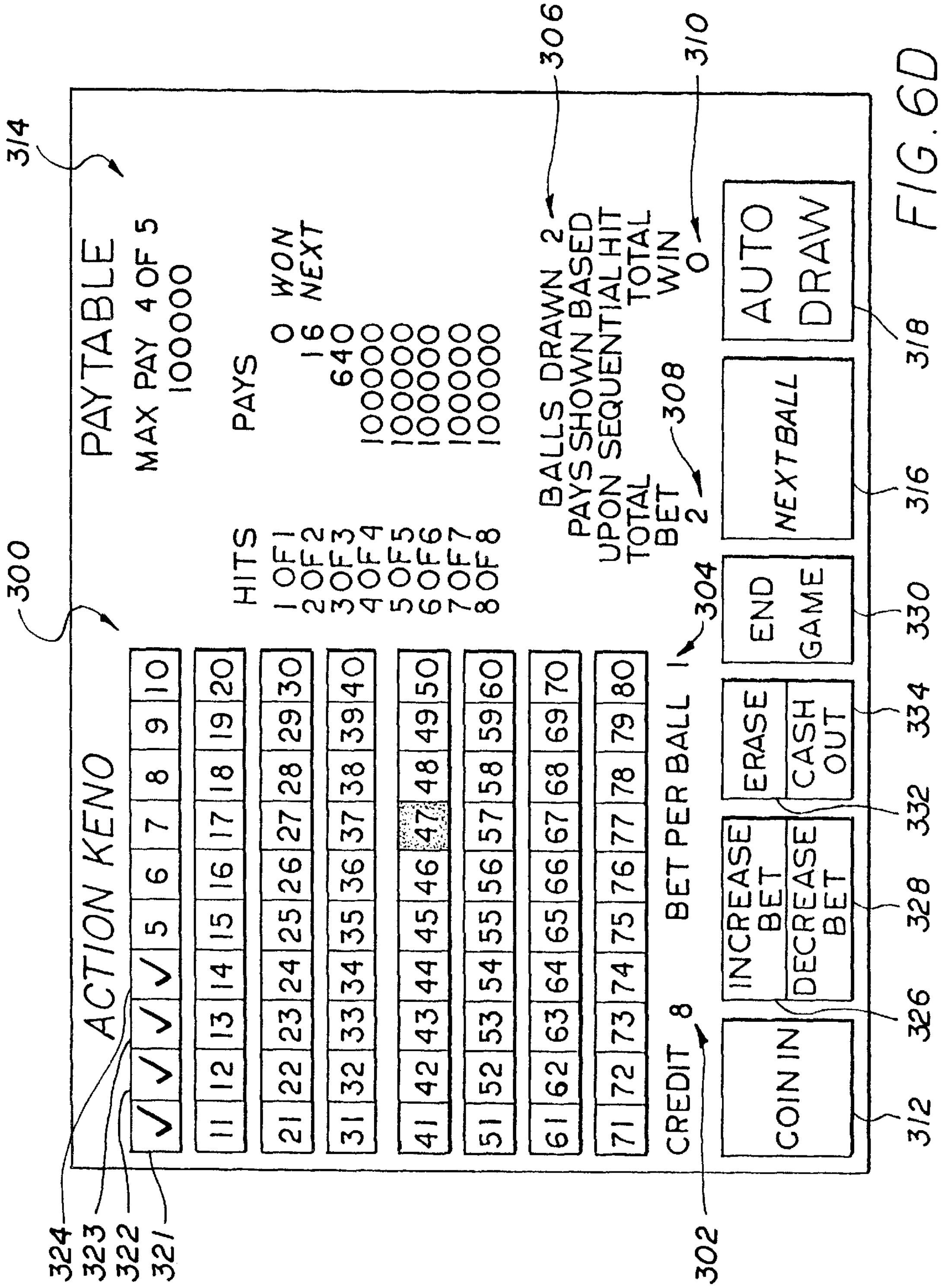

Referring now to FIG. 6D, the player has selected another ball (see balls drawn 306) and an additional credit has been deducted from the virtual bank (see credit meter 302 and total bet 308). The ball that was drawn was the 47 ball and the number 47 on card 300 is now displayed in a color different from the rest of the numbers to indicated that the 47 ball has been drawn. Paytable 314 has also changed, offering lower prizes because the probability of drawing a ball that matches one of the selected numbers has increased.

The player may continue to draw balls until the virtual bank is empty, all of the selected numbers have been drawn, or all of the balls have been drawn. The player can also end the game at any time by clicking on end game button 330. The player may then start over by clicking on erase button 332 and selecting new numbers or the player could cash out by clicking on cash out button 334.

It is to be understood that the embodiment described above and shown in the figures is intended only as an example of the present invention. It is well within the ability of someone of ordinary skill in the art to modify the game to operate on a gaming device.

Bingo

Figure 7A:
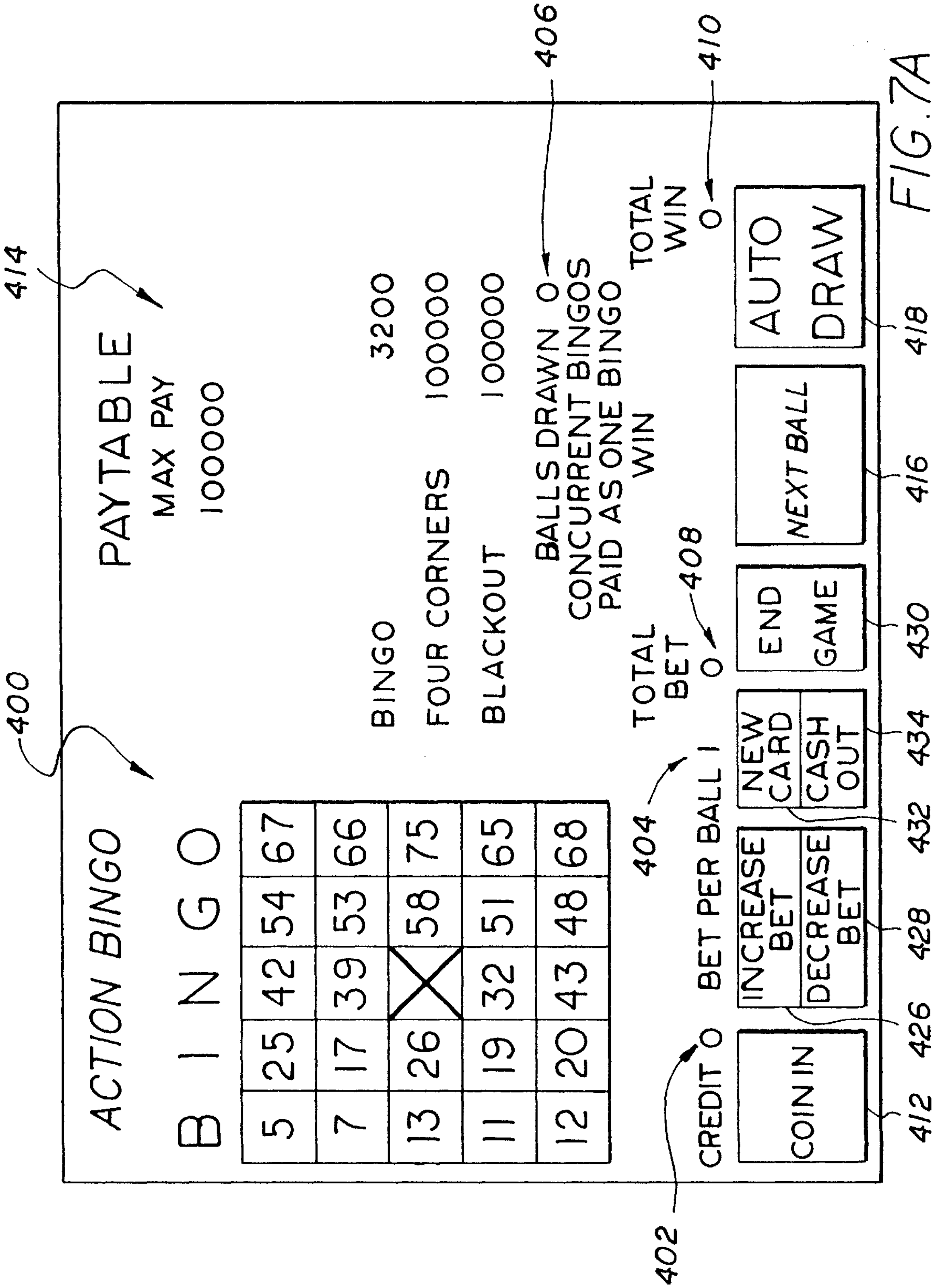
FIGS. 7A–7E are substantially schematic representations of a bingo game that be played with the present invention.

The present invention may also be implemented with a bingo game. FIG. 7A represents a starting position for a bingo game that may be played on an electronic device. Card 400 represent a standard bingo. Credit meter 402 displays the number of credits placed in the virtual bank and bet per ball 404 displays the number of credits bet per ball that is drawn. Balls drawn 406 displays the number of balls that have been drawn, total bet 408 displays the total number of credits that have been bet, and total win 410 displays the total number of credits that have been won.

Figure 7B:
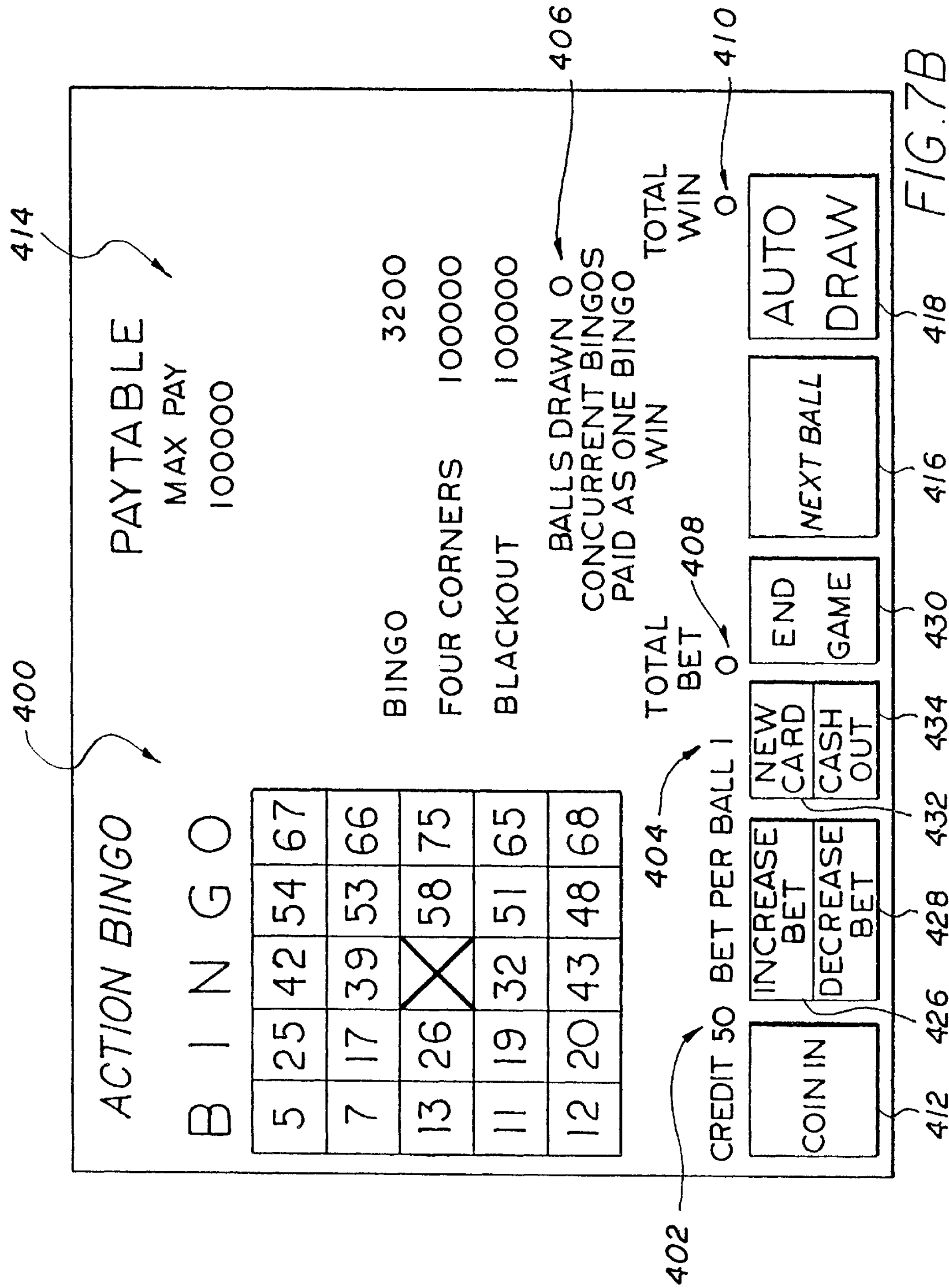

Turning now to FIG. 7B, in order to play the game, the player must provide credits. The embodiment shown in FIGS. 7A–7__, is designed to be played on a personal computer that does not accept actual coins or currency. Thus, a player adds credits to the game by clicking on coin in button 412. In the example shown in FIG. 7B, the player has pressed coin in button 412 50 times and increased credit meter 402 to 50.

Once credits have been provided, the player may increase the bet per ball by clicking on increase bet button 426 or decrease the bet per ball by clicking on decrease bet per ball button 428. In FIG. 6B, decrease bet per ball button 428 is shown in an disabled state (letters not solid) because the bet per ball 404 is set to the minimum bet of one credit per ball drawn.

Paytable 414 to the right of card 400 indicates the possible prizes that may be awarded to the player. In the preferred embodiment, paytable 414 is dynamic. The starting values of paytable 414 depend on the number of credits bet per ball. In the example shown, if the player obtains a bingo (balls are drawn that correspond to a column, row, or diagonal line on card 400), the player will be awarded 3,200 credits. If the player obtains four comers (balls are drawn that correspond to each of the comers on card 400), the player will be awarded 100,000 credits. If the player obtains a blackout (balls are drawn that correspond to every space on the card), the player will also be awarded 100,000 credits. As shown on the top of paytable 414, the maximum prize that will be awarded under these conditions is 100,000 credits.

Figure 7C:
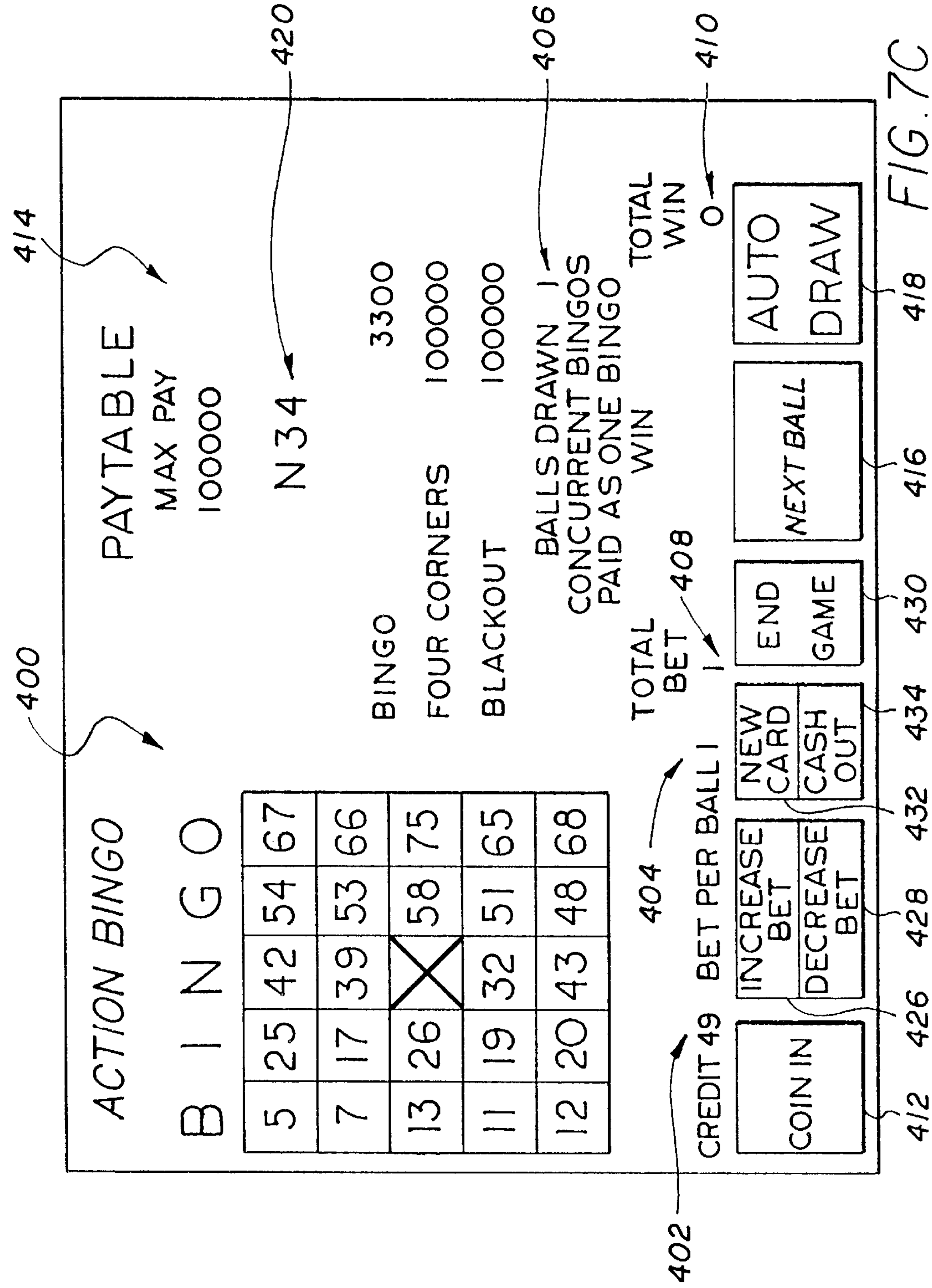

As seen in FIG. 7C, the player can draw a ball by clicking a next ball button 416 or an auto draw button 318. Next ball button 416 draws one ball while auto draw button 418 draws balls until either the player is out of credits or a ball that is drawn corresponds with one of the spaces on card 400. In the preferred embodiment, the act of drawing a ball is chargeable action. Therefore, each time the player draws a ball, a credit is deducted from the player's virtual bank. In the example shown, the player has drawn one ball (see balls drawn 406), one credit has been bet (see total bet 408), and one credit has been deducted from the virtual bank (see credit meter 402). The balls are drawn in a random order using any of a number of methods that are well known in the art.

Also in the example shown, the ball that was drawn is displayed in area 420 and it is ball N34. Since ball N34 does not correspond to any of the squares on card 400, no squares have been marked. Since the player has drawn a ball, paytable 414 has changed and the player will now receive 3,300 credits (as apposed to 3,200 credits previously indicated) if the player obtains a bingo.

Figure 7D:
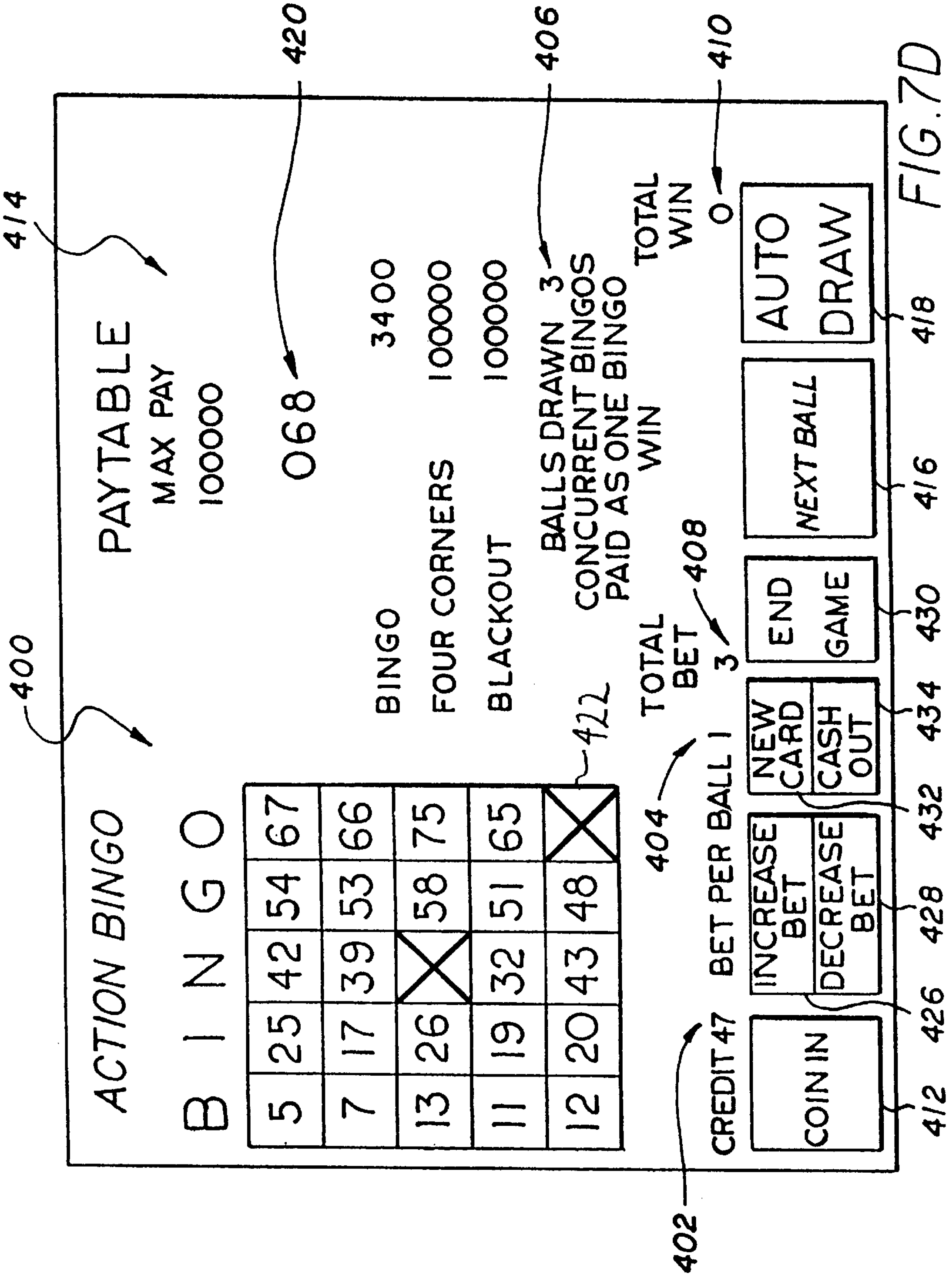

Referring now to FIG. 7D, the player has selected two more ball (see balls drawn 406) and two credits have been deducted from the virtual bank (see credit meter 402 and total bet 408). The ball that was last drawn was O68, which corresponds to square 422 on card 400. Square 422 now has an "X" in it to indicate that the corresponding ball has been drawn. Paytable 414 has also changed, offering a higher prize for a bingo.

The player may continue to draw balls until the virtual bank is empty, all of the selected numbers have been drawn, or all of the balls have been drawn. The player can also end the game at any time by clicking on end game button 430. The player may then start over by clicking on new card button 432 and selecting new numbers or the player could cash out by clicking on cash out button 434.

Figure 7E:
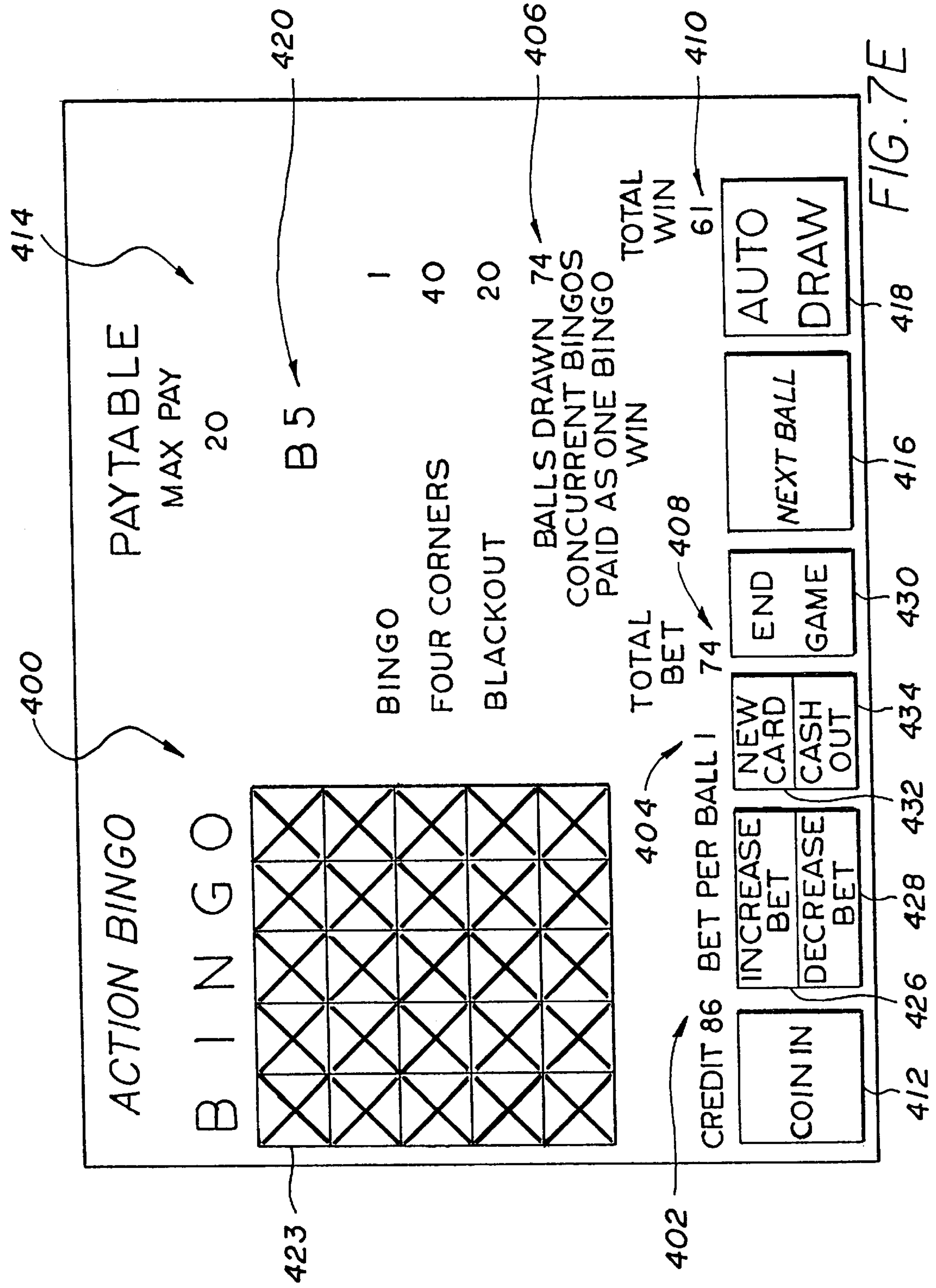

FIG. 7E discloses the same card 400 that has been played as far as it can be played. At this stage, the player has drawn 74 balls (see balls drawn 406), bet 74 credits (see total bet 408), won 61 credits (see total win 410), and blacked out all of the squares in card 400. The last ball drawn was B5, which corresponded to square 423.

It is to be understood that the embodiment described above and shown in the figures is intended only as an example of the present invention. It is well within the ability of someone of ordinary skill in the art to modify the game to operate on a gaming device.

It may now be realized from the above description that the present invention provides a novel method for wagering on multi-step games. This allows casinos to offer multi-step games, which attracts more players and encourages the players to play longer. Since the present invention charges a predefined amount for each predefined chargeable action or game-playing step a player performs, the more a player plays, the more income tends to be generated by the game.

Yet another advantage of the present invention is that it is adapted to be used with electronic devices.

Another advantage of the present invention is that it provides a multi-step wagering game that allows a player to use skill to prolong the game.

A further advantage of the present invention is that provides a wagering game that allows a player to win a large jackpot.

Another advantage of the present invention is that it provides a wagering game that may have a long or indeterminate length of game cycle.

Yet another advantage of the present invention is that it provides a multi-step wagering game that is enjoyable to play and attracts players who like to play multi-step games.

Each time a player performs a chargeable action, the player is charged a credit. The chargeable action may be an integral part of the method by which the underlying multi-step game is played. If a predefined prize event or condition occurs, the player may be awarded a predefined prize. The underlying game may continue, the player may continue to perform chargeable actions, and prizes may continue to be awarded until the underlying game reaches a point of termination.

The method of the present invention allows players who enjoy long-duration, multi-step games to engage in wagering which increases the excitement and enjoyment of the game. The operator of the wagering game benefits by attracting new customers and profiting from games which would otherwise be unsuitable for wagering.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A method of playing a keno wagering game on an electronic device, the method comprising:

(A) a player making at least one credit available to the electronic device;

(B) the player initiating a game cycle;

(C) the electronic device displaying a plurality of numbers;

(D) the player selecting at least one number;

(E) the electronic device randomly generating a number;

(F) the electronic device charging the player a predefined amount of credits for each predefined chargeable action performed, the chargeable action being a game playing action, wherein the credits charged the player are an immediate debit to the player not dependent upon the occurrence of a future event; and (G) the electronic device awarding a prize to the player if a predefined prize event occurs.

2. The method of claim 1 wherein predefined chargeable action comprises the electronic device randomly generating a number.

3. The method of claim 1 wherein the predefined prize event may occur more than once per game cycle.

4. The method of claim 1 wherein a prize event occurs when the number generated by the electronic device is the same as the number selected by the player.

5. The method of claim 1, wherein the size of the prize awarded to the player is dependent on the number of numbers selected by the player.

6. The method of claim 5, wherein the size of the prize awarded to the player is also dependent on the number of numbers randomly generated by the electronic device.

7. A method of playing a keno wagering game on an electronic device, the method comprising:

(A) a player making at least one credit available to the electronic device;

(B) the player selecting a charge amount;

(C) the player selecting at least one number;

(D) the electronic device generating a random number;

(E) the electronic device charging the player the charge amount for each predefined chargeable action performed, the chargeable action being a game playing action, wherein the charge is an immediate debit to the player not dependent upon the occurrence of a future event; and (F) the electronic device awarding a prize to the player if a predefined prize event occurs.

8. The method of claim 7, wherein the predefined prize event comprises the random number being equivalent to the number selected by the player.

9. The method of claim 7, further comprising the player causing the electronic device to generate the random number.

10. The method of claim 7, wherein the chargeable action comprises the player causing the electronic device to generate the random number.

11. The method of claim 10, wherein the size of the prize is dependent on the size of the charge amount.

12. An electronic wagering device for playing keno comprising the following:

(A) a computer, the computer being adapted to operate software, receive input commands, and communicate information to a player;

(B) game software installed on the computer, the game software being adapted to perform the following;

(a) operate a game and generate a game display, the game requiring a player to perform an indefinite number of game playing actions to complete a game cycle, the game playing actions being other than an action to begin a game cycle, the game display comprising a wagering card having a plurality of numerals;

(b) charge the player a predefined amount of credits for each predefined chargeable action the player performs, the chargeable action being a game playing action, wherein the credits charged the player are an immediate debit to the player not dependent upon the occurrence of a future event;

(c) allow the player to select values from the wagering card;

(d) generate random values, the generation of each random value being a chargeable action; and (e) award a prize to the player when a prize winning event occurs.

13. The device of claim 12, further comprising means for accepting credits from a player.

14. The device of claim 12, wherein the game software is further adapted to store credits in a virtual bank.

15. The device of claim 12, wherein a prize event occurs when a value generated by the software is equivalent to a value selected by the player.

16. The device of claim 12, wherein the prize awarded is determined from a predefined table on the game display.

17. The device of claim 16, wherein the predefined table may change during the game cycle based on a comparison of the selected values and the generated values.

* * * * *